United States Patent
Fuchs et al.

(10) Patent No.: US 8,075,771 B2
(45) Date of Patent: Dec. 13, 2011

(54) APPARATUS FOR MAGNETIC FIELD GRADIENT ENHANCED CENTRIFUGATION

(75) Inventors: Benjamin Fuchs, Wilmington, DE (US); Christian K. Hoffmann, Newark, DE (US); Karsten Keller, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 958 days.

(21) Appl. No.: 11/353,334

(22) Filed: Feb. 14, 2006

(65) Prior Publication Data

US 2006/0180538 A1    Aug. 17, 2006

Related U.S. Application Data

(60) Provisional application No. 60/653,701, filed on Feb. 17, 2005.

(51) Int. Cl.
*B01D 35/06* (2006.01)
*B03C 1/30* (2006.01)

(52) U.S. Cl. ........ 210/223; 210/695; 210/702; 210/806; 210/297; 436/523; 436/524; 436/526; 209/40; 209/214; 209/232

(58) Field of Classification Search ............ 210/695, 210/702, 767, 806, 223, 297; 494/37, 85; 436/523, 524, 526; 366/218, 244, 249, 274; 209/40, 214, 232
See application file for complete search history.

(56) References Cited

U.S. PATENT DOCUMENTS

| | | | |
|---|---|---|---|
| 1,527,069 A | 2/1925 | Peck | |
| 1,527,070 A | 2/1925 | Peck | |
| 2,648,636 A | 8/1953 | Ellis | |
| 3,195,728 A | 7/1965 | Sommermeyer | |
| 3,534,902 A | 10/1970 | Gilreath | |
| 3,696,932 A | 10/1972 | Rosenberg | |
| 3,902,994 A * | 9/1975 | Maxwell et al. ............ | 209/213 |
| 4,017,385 A | 4/1977 | Morton | |
| 4,144,163 A | 3/1979 | Kolm | |
| 4,166,788 A | 9/1979 | Druz | |
| 4,238,326 A | 12/1980 | Wolf | |
| 4,279,748 A | 7/1981 | Inoue | |
| 4,784,758 A | 11/1988 | Willis | |
| 5,183,638 A | 2/1993 | Wakatake | |
| 5,244,580 A | 9/1993 | Li | |
| 5,565,105 A | 10/1996 | Thakor | |
| 5,954,933 A | 9/1999 | Ingalls | |
| 6,150,182 A * | 11/2000 | Cassaday ..................... | 210/223 |
| 6,273,265 B1 | 8/2001 | Greenwalt | |
| 6,464,863 B1 | 10/2002 | Nguyen | |
| 6,517,813 B1 | 2/2003 | Weitschies | |

(Continued)

FOREIGN PATENT DOCUMENTS

EP    659932    6/1995

(Continued)

OTHER PUBLICATIONS

U.S. Appl. No. 11/060,001, filed Feb. 17, 2005, Karsten Keller et. al.

(Continued)

*Primary Examiner* — David A Reifsnyder

(57) ABSTRACT

This invention relates to apparatus for carrying out continuous or batch centrifugation solid-liquid separation processes in which the solid-liquid mixture is subjected to magnetic field gradients and centrifugation.

27 Claims, 2 Drawing Sheets

U.S. PATENT DOCUMENTS

| | | |
|---|---|---|
| 7,070,684 B1 | 7/2006 | Fuhr |
| 2003/0146174 A1 | 8/2003 | Hansen |
| 2005/0252864 A1 | 11/2005 | Keller |
| 2005/0261479 A1 | 11/2005 | Hoffmann |
| 2006/0180538 A1 | 8/2006 | Fuchs |
| 2006/0191834 A1 | 8/2006 | Fuchs |
| 2006/0281194 A1 | 12/2006 | Fuchs |

FOREIGN PATENT DOCUMENTS

| | | |
|---|---|---|
| FR | 2128128 | 10/1972 |
| GB | 2153707 | 8/1985 |
| GB | 1490598 | 11/1997 |
| JP | 53-109272 | 9/1978 |
| JP | 58-088043 | 5/1983 |
| JP | 61-106519 | 5/1986 |
| JP | 62-079861 | 4/1987 |
| JP | 09-276624 | 10/1997 |
| JP | 2000-312838 | 11/2000 |
| JP | 2003-144973 | 5/2003 |

OTHER PUBLICATIONS

U.S. Appl. No. 11/060,004, filed Feb. 17, 2005, Benjamin Fuchs et. al.

International Search Report and Written Opinion in International Applic. No. PCT/US2005/005043 dated Sep. 9, 2009 (European Patent Office, NL-2280 HV Rijswijk).

International Search Report and Written Opinion in International Applic. No. PCT/US2005/005045 dated May 24, 2005 (European Patent Office, NL-2280 HV Rijswijk).

International Search Report and Written Opinion in International Applic. No. PCT/US2006/005774 dated Jun. 28, 2006 (European Patent Office, NL-2280 HV Rijswijk).

International Search Report and Written Opinion in International Applic. No. PCT/US2006/005773 dated Jun. 28, 2006 (European Patent Office, NL-2280 HV Rijswijk).

* cited by examiner

APPARATUS FOR MAGNETIC FIELD GRADIENT ENHANCED CENTRIFUGATION

This application claims the benefit of U.S. Provisional Application No. 60/653,701, filed Feb. 17, 2005, which is incorporated in its entirety as a part hereof for all purposes.

TECHNICAL FIELD

This invention relates to a centrifugation apparatus that is enhanced by the presence of magnetic field gradients.

BACKGROUND

The use of solid-liquid separations is widespread and ranges from the large volume separations of minerals from solid-liquid mixtures to the small batch separations of high value products in the biotechnology or pharmaceutical industries. Gravitation, pressure, temperature, centrifugation, and fluid dynamics have been the dominant aspects of conventional solid-liquid separation for the past 50 years. Conventional solid-liquid separation typically consists of two primary steps. In the first step, the solid particulate is separated from the liquid by the application of pressure. The pressure may be applied by means for mechanically applying pressure, which may include a piston, gas pressure, hydrodynamic pressure, gravitational pressure, centrifugal pressure or a combination thereof wherein the liquid passes through a filter and the solid is retained by the filter. One problem encountered is solid loss as a result of solid "breaking through", i.e. passing through, the filter. An even more serious problem is that the mechanical separation step does not result in a complete separation. This necessitates the second step, a thermal drying process.

The thermal drying process is very much less energy efficient, a factor of over 100-200 times less energy efficient, than the mechanical step. Since enormous volumes of materials are processed each year, more efficient mechanical solid-liquid separations will result in dramatic reductions in overall energy consumption by reducing downstream drying requirements. This would impact energy consumption since thermal drying accounts for a significant portion of total worldwide energy consumption.

In some instances, high-gradient magnetic field separation has been used to separate particular magnetic solids from a mixture of solids in a liquid.

An object of the present invention is to provide an apparatus that enables more efficient separation of solid-liquid mixtures containing magnetic particles.

SUMMARY

This invention provides an apparatus for the centrifugation separation of a solid-liquid mixture containing magnetic particles that includes a container within which centrifugation occurs, and a rotating magnetic matrix within the container. The separation process that this apparatus performs is enhanced by the presence of magnetic field gradients. The rotating magnetic matrix is the source of the magnetic field gradients. The magnetic forces provided by these localized magnetic field gradients attract the magnetic particles to the rotating magnetic matrix. The invention provides an apparatus that can be used for a continuous process as well as apparatus that can be used for a batch process.

The apparatus further comprises means for providing a magnetic field in the region of the apparatus occupied by the magnetic matrix.

The apparatus of the invention may be used where the solid-liquid mixture contains ferromagnetic, ferrimagnetic, anti-ferromagnetic, paramagnetic or diamagnetic solids, or where the solid-liquid mixture is seeded with ferromagnetic or paramagnetic particles. The apparatus is also useful where magnetic particles are attached to targeted materials to be separated, i.e. when "functionalized magnetic beads" are used and attached to high value target materials such as proteins, DNA plasmids and other biological materials.

Magnetic matrices that produce field gradients $\geq 100$ T/m have been found to be useful in this apparatus. Preferred are magnetic matrices that produce high magnetic field gradients such as gradients $\geq 5000$ T/m.

DETAILED DESCRIPTION

Figure 1A:
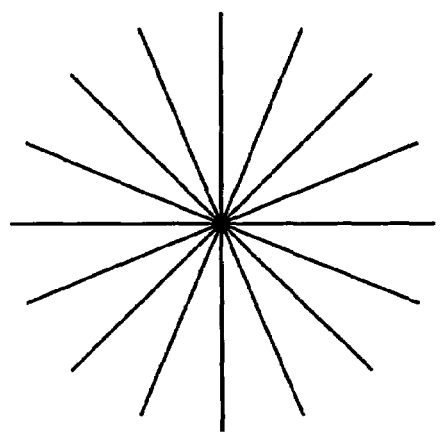
FIG. 1 shows some examples of configurations of the elements of a magnetic matrix.
Figure 1B:
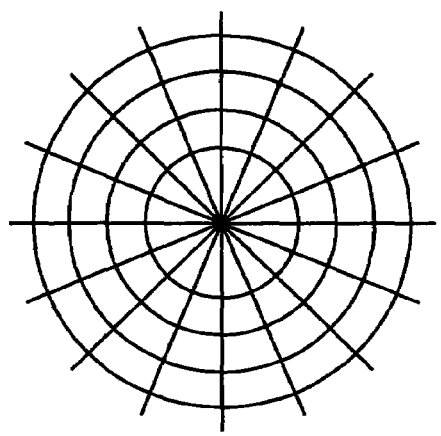
Figure 1C:
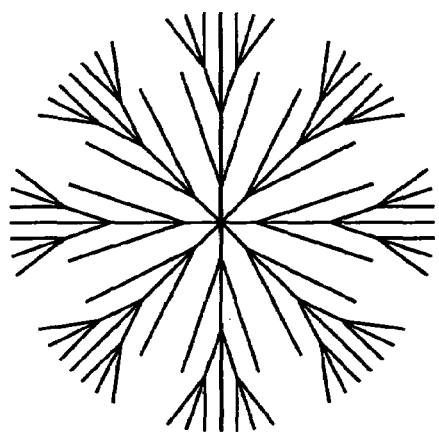
Figure 1D:
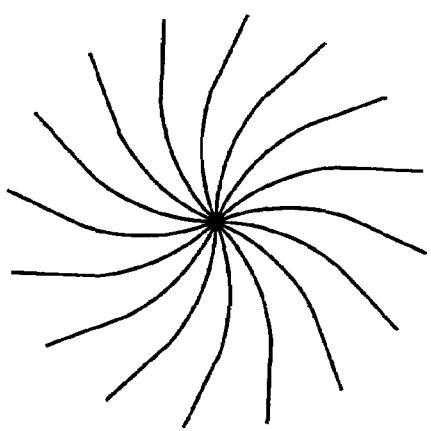
Figure 1E:
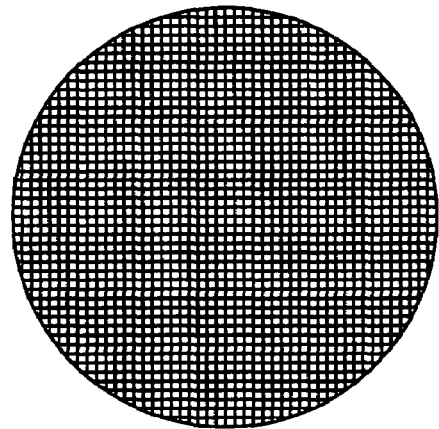

This invention provides an apparatus to perform the continuous or batch centrifugation solid-liquid separation of solid-liquid mixtures containing magnetic particles wherein the performance of the apparatus is enhanced by the presence of magnetic field gradients.

The apparatus of this invention simultaneously subjects the solid-liquid mixture to centrifugation and magnetic field gradients. These gradients may be localized magnetic field gradients in the sense that they are operative within the apparatus in which separation is occurring, and cause the magnetic particles to experience movement within the apparatus as a result. A magnetic field gradient provides a magnetic force on the magnetic particles present in the solid-liquid mixture. The particles may be ferromagnetic, ferrimagnetic, anti-ferromagnetic, paramagnetic or diamagnetic particles. A rotating magnetic matrix produces the magnetic field gradients, and the magnetic forces provided by the magnetic field gradients attract the magnetic particles to the magnetic matrix. Magnetic field gradients are preferably $\geq 100$ T/m. Most preferred are high magnetic field gradients such as gradients $\geq 5000$ T/m.

The magnetic matrix may be constructed of any material that will provide magnetic field gradients in a magnetic field. Typically, it is constructed of a material that will provide magnetic field gradients when placed in a magnetic field, such as steel wires, steel rods, steel wool and/or steel screens. The magnetic matrix may include one element comprised of an array of magnetic wires, or may include a plurality of such elements that may be alike or different. The elements may be arranged within the container in a variety of configurations. In one embodiment the element is planar, and the plane is perpendicular to the axis of the container.

Examples of some configurations that the elements of a matrix may take are shown in FIG. 1. FIG. 1a shows a matrix comprised of wires or rods extending radially outward from the center. FIG. 1b shows a matrix comprised of wires extending radially outward and wires in concentric circles. FIG. 1c shows a matrix comprised of branched wires extending outward. FIG. 1d shows a matrix comprised of curved wires extending outward from the center. FIG. 1e shows a matrix comprised of a screen. The wires may vary in shape and size. The elements of a matrix may vary in diameter with respect to the diameter of the container. In one embodiment, the elements of a matrix may be constructed such that they extend from the center, e.g. the axis, of the container, to the edge, e.g. the inner wall, of the container. Wires as elements of a magnetic matrix may be free standing or may be supported. In another embodiment, rather than being planar, the element may be in the shape of a cone with its axis along the axis of the container.

The apparatus is thus also comprised of means for providing a magnetic field that operates on the magnetic matrix. The means for providing a magnetic field may include a solenoid or a permanent magnet that is internal or external to the container within which the magnetic matrix is rotating.

The magnetic matrix is rotated within a container into which the solid-liquid mixture is fed. The container within which the magnetic matrix is rotating can be a centrifuge with a rotating part, in which case the rotating part of the centrifuge and the rotating magnetic matrix both contribute to the centrifugal force experienced by the magnetic particles. The term "centrifuge" is used herein to include any container that has a rotating rotor, rotating screw or other rotating part that provides a centrifugal force. It may include decanters, separators and hydrocyclones that provide a centrifugal force. In this case, the magnetic matrix can be fixed to the rotor, screw or axle of the centrifuge and rotate at the same frequency as the centrifuge, or be attached to a separate axle with a separate drive to independently adjust the rotation frequency. The difference in centrifuge and magnetic matrix rotation frequencies can be used as a parameter to adjust the operation of the separation process. The term "centrifuge" also include a static centrifuge with a tangential, e.g. radial, inlet that results in a spiral motion of the solid-liquid mixture and a centrifugal force.

Alternatively, the container within which the magnetic matrix is rotating can be a stationary one, i.e. a container that does not rotate. In this case, the rotating magnetic matrix is the sole source of the centrifugal force on the magnetic particles.

The magnetic particles in the solid-liquid mixture can be ferromagnetic, ferrimagnetic, anti-ferromagnetic, paramagnetic or diamagnetic. The solid-liquid mixture may also be seeded with ferromagnetic or paramagnetic particles to promote separation. The apparatus hereof is also effective when "functionalized magnetic beads" are used, i.e. when magnetic particles are attached to targeted solids to be separated. High value targeted materials such as costly biomaterials can be attached to such magnetic particles in order to facilitate the separation process and reduce the loss of the costly biomaterial. "Functionalized magnetic beads" are magnetic particles that are "functionalized" by treating their surfaces with a biological or chemical entity known to bind to the targeted biological material. After the "functionalized magnetic beads" with the attached targeted materials are isolated, a separation step can separate the targeted materials from the functionalized magnetic beads. The magnetic beads can be reused. "Magnetic particles" as used herein includes all of the types of magnetic materials mentioned above in this paragraph.

As a result of the magnetic field operating on the matrix, magnetic particles are attracted to and adhere to the magnetic matrix. As a result of the centrifugal force, the magnetic particles move radially outward toward the inner wall or other edge of the container. The motion of the magnetic particles radially outward and their collection at the outer ends of the magnetic matrix results in a self-cleaning of the magnetic matrix so that additional magnetic particles can be collected.

When the rotating magnetic matrix is the sole source of the centrifugal force, essentially only the magnetic particles experience the centrifugal force since they adhere to the rotating magnetic matrix. These magnetic particles move outward toward the inner wall or other edge of the container where they can be collected. An apparatus with a stationary container and a rotating magnetic matrix that is the sole source of centrifugal force is especially useful for separating magnetic particles from a solid-liquid mixture wherein the magnetic particles contained therein are to be recovered, and the non-magnetic particles are considered part of the waste product.

The apparatus will contain an inlet through which the solid-liquid mixture can be fed. The solid-liquid mixture may be fed into the container either axially or tangentially, i.e. radially. The solid-liquid mixture may include flocculents, surfactants and sols as needed. The solid-liquid mixture typically has many of the same characteristics as a suspension.

In one embodiment, the apparatus is designed so that the separation can be run as a continuous process. The solid-liquid mixture is continuously fed through an inlet into the container within which the magnetic matrix is rotating. Means for collecting the magnetic particles at the outer end of the magnetic matrix, and to remove them from the container through a product outlet, are provided. Any non-magnetic particles in the solid-liquid mixture are not attracted to the magnetic matrix, flow with the liquid through the container and are emitted from the container with the liquid in a waste stream through a waste outlet.

In a continuously-run apparatus, provision is made for feeding the solid-liquid mixture into one end of the container through a feed inlet and removing the residue of the solid-liquid mixture from the container after the magnetic particles have been separated from it. The residue can be liquid only or can be a mixture of liquid and non-magnetic particles. In this embodiment, the apparatus further comprises a feed inlet through which the solid-liquid mixture can be fed continuously into the container; a product outlet through which the separated magnetic particles can be emitted from the container; and a waste product outlet through which the residue of the solid-liquid mixture, after having passed through the rotating magnetic matrix, can be emitted from the container outlet.

In various embodiments for carrying out a continuous process of separation, the container itself has no rotating parts, and the rotating magnetic matrix is the sole source of centrifugal force. In one such embodiment, the container is comprised of a set of two concentric right circular cylinders of different diameters wherein the wall of smaller-diameter cylinder encloses a cylindrical region, and the two walls of the set of cylinders encloses a region having the shape of a cylindrical shell or annular ring. Each element of the rotating magnetic matrix extends from the axis of the container through an opening in the wall of the smaller-diameter cylinder, the opening being provided to permit each element to extend into the cylindrical shell region.

In this embodiment, the apparatus may also comprises a buffer solution inlet that enters one end of the cylindrical shell region. The feed inlet for the solid-liquid mixture enters the cylindrical region inside the smaller-diameter cylinder at the same end of the container as the buffer solution inlet. The waste outlet exits from the end of the cylindrical region inside the smaller-diameter cylinder opposite the end in which the feed inlet enters. The product outlet exits from the end of the cylindrical shell region opposite the end in which the buffer solution inlet enters.

Figure 2A:
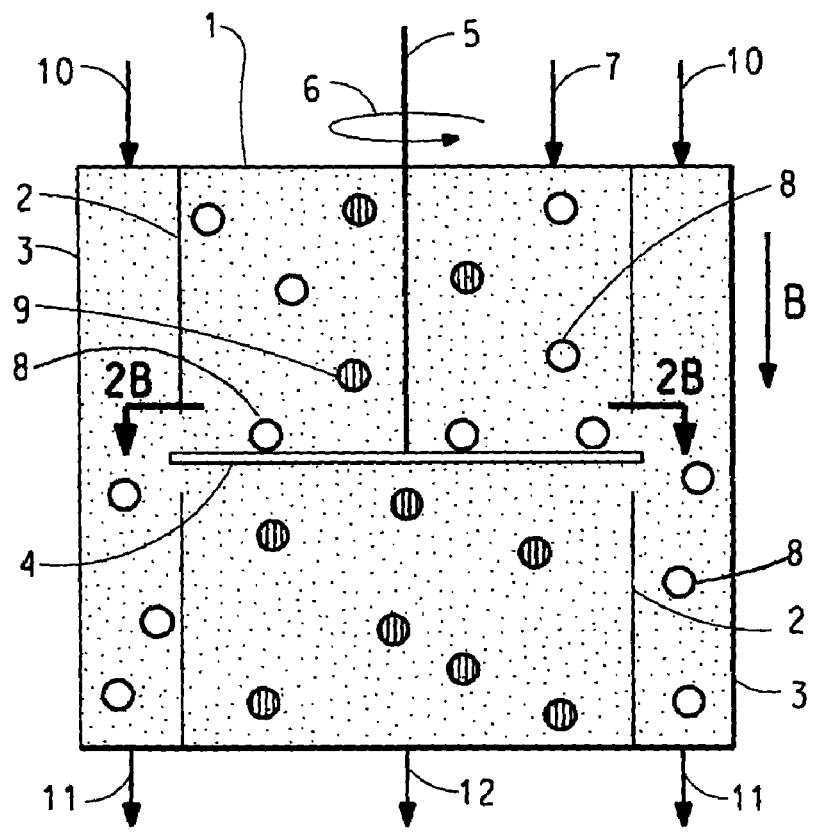
FIG. 2 is schematic drawing showing one embodiment of a magnetic field gradient enhanced centrifugation apparatus for carrying out a continuous separation process.

A schematic drawing of this embodiment of an apparatus for running a continuous process, and in which the rotating magnetic matrix is the sole source of the centrifugal force that operates on the solid-liquid mixture, is shown in FIG. 2. FIG.

2a shows a vertical cross-section of a container 1 in the form of a right circular cylinder with a smaller-diameter cylinder disposed therein. The vertical wall 2 of smaller-diameter cylinder encloses an inner cylindrical space, and walls 2 and 3 enclose an outer cylindrical shell. The rotating magnetic matrix 4 is attached to shaft 5 along the axis of the container. Means for rotating shaft 5 are provided as indicated by arrow 6. The means for rotating shaft 5 may include, for example, a motor connected to the shaft. The apparatus further comprises means for providing a magnetic field that will operate on the magnetic matrix, and the arrow labeled B indicates the presence and direction of the magnetic field. The field can be directed in other directions, but preferably is parallel to the axis of the container or has a large component parallel to the axis of the container.

Figure 2B:
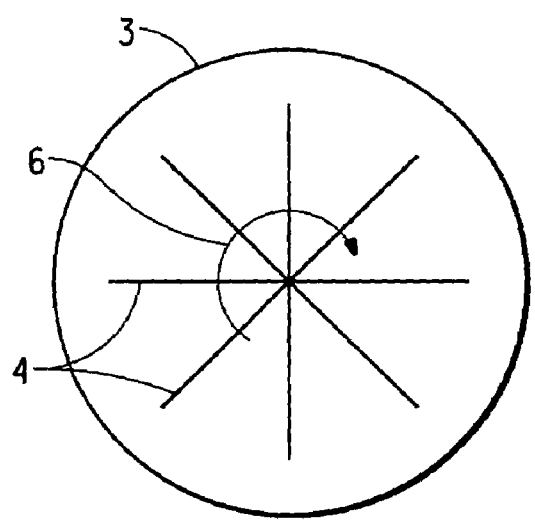

FIG. 2b is a horizontal cross-section showing the configuration of the rotating magnetic matrix 4. In this case, the magnetic matrix is comprised of only one type of element, being the wires or rods as shown, but similar or different elements could be attached to and rotated by shaft 5. The configuration shown for the element is similar to that shown in FIG. 1a, i.e. with wires or rods extending radially outward from the center. The wires or rods extend from the shaft through an opening in wall 2 and into the outer cylindrical shell.

The solid-liquid mixture is continuously fed into the inner cylinder through an inlet as indicated by arrow 7. The solid-liquid mixture is comprised of magnetic particles shown as spheres with white centers 8, non-magnetic solids shown as lined black spheres 9 and the liquid. The solid-liquid mixture flows from the top of the inner cylinder toward the bottom as a result of any applied pressure and gravity. As a result of the magnetic field gradient at the magnetic matrix and the resulting magnetic force, the magnetic particles are attracted to and adhere to the magnetic matrix. High magnetic field gradients are preferred since they result in larger forces and stronger adherence of the magnetic particles to the magnetic matrix. As a result of the centrifugal force provided by the rotating magnetic matrix, the magnetic particles move radially outward toward wall 2. They enter the outer cylindrical shell through the opening in wall 2.

Means for collecting and removing the magnetic particles in this embodiment is provided by a liquid phase buffer solution. The liquid phase buffer solution is fed into the outer cylindrical shell through an inlet as indicated by arrows 10. The liquid phase buffer solution flows from the top of the cylindrical shell toward the bottom as a result of any applied pressure and gravity. As the magnetic particles pass through the opening in wall 2 and enter the outer cylindrical shell, they are caught up in the flow of the buffer solution and emitted from the apparatus through a product outlet as indicated by arrows 11. The buffer solution is chosen so as to facilitate the separation of the magnetic particles from the solution. When the magnetic particles are functionalized magnetic beads with target products attached, the target products are separated from the magnetic beads and the magnetic beads are reused. The non-magnetic particles are not attracted to the magnetic matrix, experience essentially no centrifugal force, continue to flow with the liquid of the solid-liquid mixture through the inner cylinder and are emitted from the inner cylinder with the liquid through a waste outlet as indicated by arrow 12.

The apparatus of this invention can be used for selective separation, i.e. to separate magnetic particles from non-magnetic particles and a liquid. The apparatus can also be used to separate magnetic particles from a liquid, or to classify different sized magnetic particles. The high gradient magnetic fields result in high magnetic forces that allow the separation of smaller magnetic particles and therefore enable the use of smaller particles as magnetic beads. Agglomeration as a result of the presence of a magnetic field facilitates such separations. Magnetic nanoparticles can be separated by the apparatus of the invention.

Other separation devices, and methods for their use, suitable for use herein are described in U.S. application Ser. No. 11/060,001, presently allowed and Ser. No. 11/060,004, both filed Feb. 17, 2005, presently allowed each of which is incorporated in its entirety as a part hereof for all purposes.

What is claimed is:

1. An apparatus for the centrifugal separation of a solid-liquid mixture containing magnetic particles, comprising (a) a rotating container within which centrifugation occurs, (b) a magnetic matrix that rotates within the container, and (c) a source external to the container providing a magnetic field.

2. The apparatus of claim 1, wherein the source of magnetic field comprises a solenoid or a permanent magnet.

3. The apparatus of claim 1, wherein the container is a centrifuge.

4. The apparatus of claim 1, wherein the rotating magnetic matrix produces magnetic field gradients with magnitudes $\geq 100$ T/m.

5. The apparatus of claim 1, wherein the rotating magnetic matrix produces magnetic field gradients with magnitudes $\geq 5000$ T/m.

6. The apparatus of claim 1, wherein the rotating magnetic matrix comprises an array of magnetic wires.

7. The apparatus of claim 6, wherein the array of magnetic wires comprises a shape selected from the group consisting of concentric circles, branched wires, curved wires, a screen and a cone.

8. The apparatus of claim 1, wherein the container has an axis and an inner wall, and the rotating magnetic matrix extends from the axis of the container to the inner wall of the container.

9. The apparatus of claim 1, further comprising (d) a feed inlet through which the solid-liquid mixture is fed continuously into the container; (e) a product outlet through which the separated magnetic particles are emitted from the container; and (f) a waste outlet through which the residue of the solid-liquid mixture, which has passed through the rotating magnetic matrix, is emitted from the container.

10. The apparatus of claim 1 which has an axis; wherein the container is comprised of two concentric right-circular cylinders of different diameters; the wall of the smaller-diameter cylinder encloses an inner cylindrical region; the respective walls of the two cylinders enclose a cylindrical shell region; and each element of the rotating magnetic matrix extends from the axis of the container through an opening in the wall of smaller-diameter cylinder and into the cylindrical shell region.

11. The apparatus of claim 10, further comprising a buffer solution inlet that enters the cylindrical shell region at a first end of the container; an inlet for the solid-liquid mixture that enters the inner cylindrical region at the first end of the container; a waste outlet that exits from the inner cylindrical region at a second end of the container; and a product outlet that exits from the cylindrical shell region at the second end of the container.

12. An apparatus according to claim 1 wherein the container and magnetic matrix rotate at the same speed.

13. An apparatus according to claim 1 wherein the container and magnetic matrix rotate at different speeds.

14. An apparatus according to claim 1 wherein the container has a wall, and the magnetic matrix protrudes through an opening in the wall.

15. An apparatus for the centrifugal separation of a solid-liquid mixture containing magnetic particles, comprising (a) a container within which centrifugation occurs that has an axis and a wall; (b) magnetic matrix that rotates within the container and attracts magnetic particles; and (c) circumferential opening in the wall through which magnetic particles are passed from the magnetic matrix.

16. An apparatus according to claim 15 wherein the magnetic matrix comprises an array of magnetic wires.

17. An apparatus according to claim 16 wherein the array of magnetic wires comprises a shape selected from the group consisting of concentric circles, branched wires, curved wires, a screen and a cone.

18. An apparatus according to claim 15 wherein the container is rotatable.

19. An apparatus according to claim 18 wherein the container and magnetic matrix rotate at the same speed.

20. An apparatus according to claim 18 wherein the container and magnetic matrix rotate at different speeds.

21. An apparatus according to claim 15 wherein the container has an axis and an inner wall, and the rotating magnetic matrix extends from the axis of the container to the inner wall of the container.

22. An apparatus according to claim 15 wherein the magnetic matrix protrudes through an opening in the wall.

23. An apparatus according to claim 15 wherein the magnetic particles comprise functionalized magnetic beads attached to biological materials.

24. An apparatus according to claim 15 wherein the mixture comprises magnetic particles of different size, and/or magnetic particles and non-magnetic materials.

25. An apparatus according to claim 15 wherein the magnetic matrix is planar.

26. An apparatus according to claim 25 wherein the plane of the magnetic matrix is perpendicular to the axis.

27. An apparatus according to claim 25 wherein the magnetic matrix is in planar alignment with the circumferential opening.

* * * * *